(12) United States Patent
Morrish

(10) Patent No.: US 8,724,273 B2
(45) Date of Patent: May 13, 2014

(54) TRANSIENT BLOCKING UNIT WITH STRONG RESET CAPABILITY

(75) Inventor: Andrew J. Morrish, Saratoga, CA (US)

(73) Assignee: Bourns, Inc., Riverside, CA (US)

( * ) Notice: Subject to any disclaimer, the term of this patent is extended or adjusted under 35 U.S.C. 154(b) by 57 days.

(21) Appl. No.: 12/932,430

(22) Filed: Feb. 25, 2011

(65) Prior Publication Data

US 2012/0218675 A1    Aug. 30, 2012

(51) Int. Cl.
*H02H 9/02*    (2006.01)

(52) U.S. Cl.
USPC ............................................. 361/58; 327/427

(58) Field of Classification Search
CPC .................................. H02H 9/02; H02H 3/20
USPC ............................................. 361/58; 327/427
See application file for complete search history.

(56) References Cited

U.S. PATENT DOCUMENTS

| | | |
|---|---|---|
| 7,576,962 B2 | 8/2009 | Harris |
| 2003/0184933 A1* | 10/2003 | Lin et al. ........................ 361/56 |
| 2005/0128669 A1 | 6/2005 | Harris |
| 2009/0231773 A1* | 9/2009 | Morrish ........................ 361/101 |

* cited by examiner

*Primary Examiner* — John Breene
*Assistant Examiner* — Haihui Zhang
(74) *Attorney, Agent, or Firm* — Lumen Patent Firm

(57) ABSTRACT

Transient blocking unit reset capability is improved by adding one or more transistors in parallel to one of the main blocking transistors of the circuit. These additional transistors switch off at higher voltages than their corresponding main blocking transistor, and have higher on-resistances than their corresponding main blocking transistor. The resulting transient blocking unit characteristic has two or more different slopes in the negative differential resistance part of the circuit I-V characteristic. This piecewise linear behavior can be exploited to ensure that the circuit I-V characteristic only has a single intersection with a normal load characteristic. By satisfying this condition, automatic reset is ensured, because the combination of the transient blocking unit with any load that is consistent with the normal load characteristic will have only one stable operating point.

14 Claims, 8 Drawing Sheets

TRANSIENT BLOCKING UNIT WITH STRONG RESET CAPABILITY

FIELD OF THE INVENTION

This invention relates to protective circuits for blocking electrical transients.

BACKGROUND

Various approaches have been employed to protect electrical circuitry from transients. One such approach is the use of a transient blocking unit, which is connected in series with the load it protects. A transient blocking unit rapidly and automatically transitions to a high-resistance state when the current passing through it exceeds a threshold current, thereby protecting the load.

Once a transient blocking unit has transitioned to its high-resistance state, it will remain in that state as long as the transient persists. After the transient has ended, it is desirable for the transient blocking unit to automatically return to its normal operating low-resistance state. Returning to the low-resistance state in this manner is referred to as a "reset" of the transient blocking unit.

In some cases, this reset occurs as desired without the need for any special measures. However, there are also cases of practical significance where automatic reset does not occur. Accordingly, it would be an advance in the art to provide a transient blocking unit with enhanced reset capability.

SUMMARY

Transient blocking unit reset capability is improved by adding one or more transistors in parallel to one of the main blocking transistors of the circuit. These additional transistors switch off at higher voltages than their corresponding main blocking transistor, and have higher on-resistances than their corresponding main blocking transistor. The resulting transient blocking unit characteristic has two or more different slopes in the negative differential resistance part of the circuit I-V characteristic. This piecewise linear behavior can be exploited to ensure that the circuit I-V characteristic only has a single intersection with a normal load characteristic. By satisfying this condition, automatic reset is ensured, because the combination of the transient blocking unit with any load that is consistent with the normal load characteristic will have only one stable operating point.

This approach has numerous applications. One application relates to telecom lines. This is particularly the case for "wet" telephone lines, where a "wetting" or "sealing" DC bias current is present in order to assist with maintaining good switch contact integrity in the phone system. Under those circumstances, it has been found that a conventional transient blocking unit may remain in a blocking state after a transient has occurred and dissipated, thereby disabling the line.

For many phone line systems, reset is not an issue, as most systems do not employ a sealing current. However, in some systems sealing currents may be found. This becomes particularly problematic when a general use protection device must operate in any type of phone system, where the presence of a sealing current may not be known.

DETAILED DESCRIPTION

Figure 1:
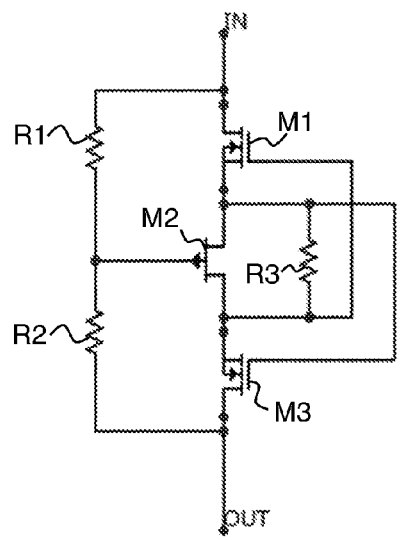
FIG. 1 shows a schematic of a conventional transient blocking unit.

To better appreciate the present invention, it is helpful to consider the operation of the conventional transient blocking unit of FIG. 1 in some detail. Transistors M1, M2, and M3 are depletion mode (i.e., normally on) devices. Transistors M1, M2, and M3 are connected in series such that current that passes through the circuit passes through each of the three transistors. As this current increases, the drain-source voltages across each of the transistors increase. These drain-source voltages are provided to the gates of the transistors and tend to turn off two of the transistors, depending on the polarity of the current. For example, transistors M1 and M2 will tend to turn off for one current polarity, while transistors M3 and M2 will tend to switch off for the other current polarity.

As the transistors tend to turn off, their drain-source voltages increase, thereby increasing the relevant gate voltages and establishing a positive feedback effect. As a result of this positive feedback effect, the transient blocking unit will transition rapidly and automatically to a high-resistance blocking state once the current exceeds a threshold current. Resistors R1 and R2 provide feedback signals to the gate of M2. The resistor R3 is used to allow a steady low level "quiescent" or reset current to flow during the blocking mode of operation. The significance of this current will become more apparent from the following considerations.

Figure 2:
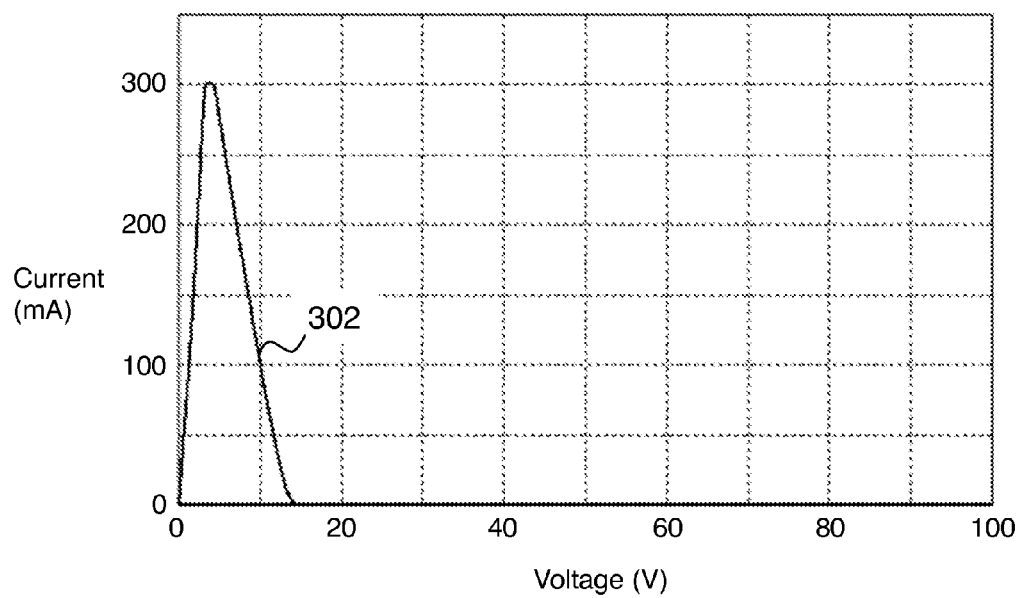
FIG. 2 shows a typical I-V characteristic for the circuit of FIG. 1.

A typical characteristic 302 for the transient blocking unit of FIG. 1 is shown in FIG. 2. When a voltage $V_T$ is applied across the transient blocking unit, the current $I_T$ increases linearly until it reaches a peak (in this case 300 mA), and then decreases until it reaches an almost constant low level, called the quiescent current. This current is typically around 1 mA, and is set such that the peak power dissipation in the transient blocking unit is acceptably low while standing off high voltages. For example, when 850V is applied to the transient blocking unit, the 1 mA of quiescent current will create 850 mW of power dissipation in the transient blocking unit. It might therefore be assumed that this quiescent current should be kept very low, but as will be seen later, a non-negligible quiescent current is needed to allow the transient blocking unit to reset.

The transient blocking unit exhibits a negative resistance characteristic over the portion of the I-V characteristic where the current decreases from its maximum. This region ends at a voltage which is called the reset voltage. In the example of FIG. 2, the reset voltage is about 14 V, and the negative resistance range is from about 4V to about 14 V.

Figure 3:
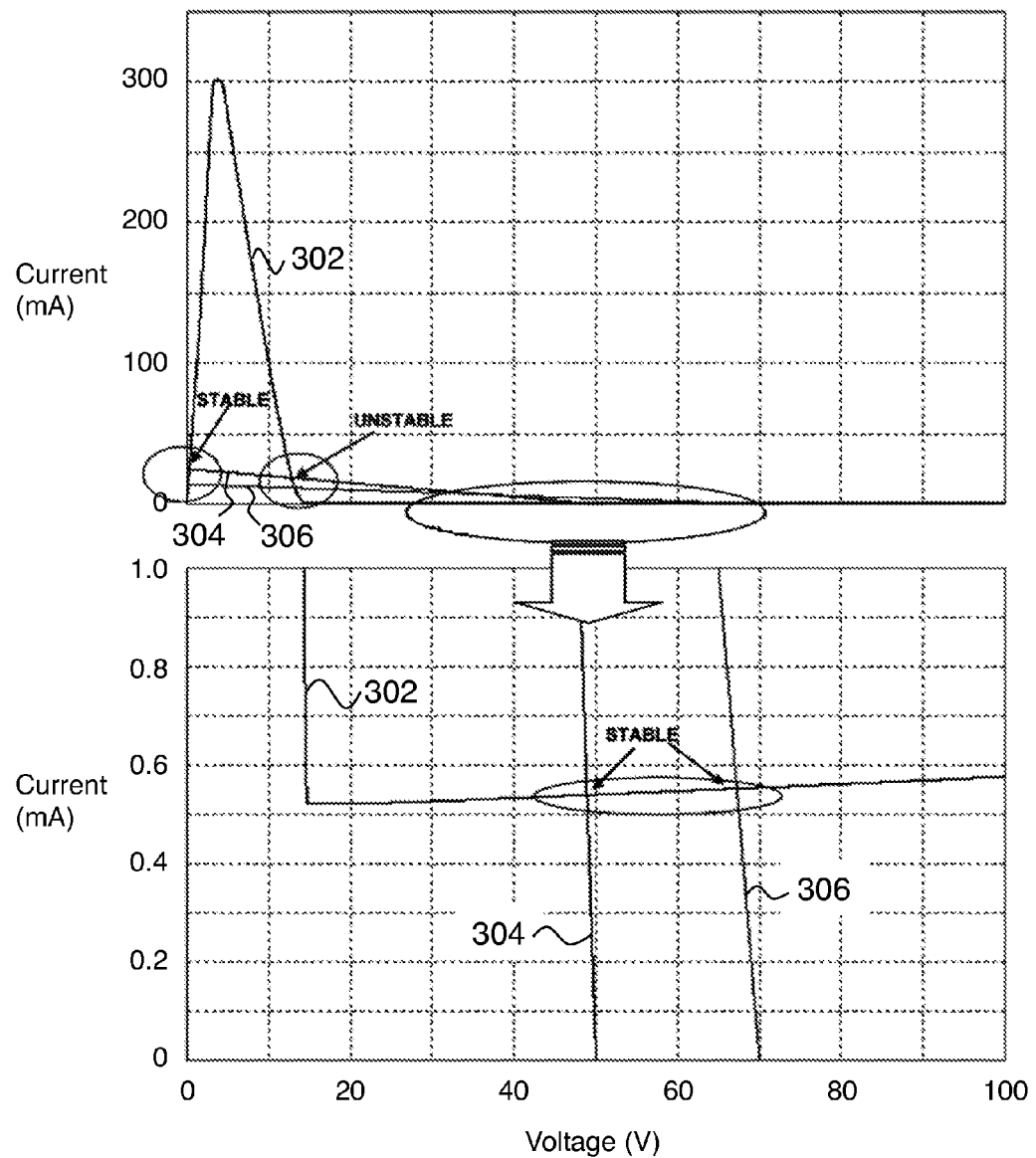
FIG. 3 shows the I-V characteristic of FIG. 2 in relation to two low-resistance load lines.

To understand the problem of resetting heavy loads, a load line analysis can be performed as shown in FIG. 3. In this example, two load lines are shown of two different resistances from two different voltage sources. Line 306 is the load line of a 5 kohm load from a 70V source, and line 304 is the load line of a 2 kohm load from a 50V source. These are representative of worst case leakage and sealing currents in telecom applications. Characteristic 302 is the transient blocking unit characteristic of FIG. 2. The bottom part of FIG. 3 shows an expanded vertical scale for low currents. It can be seen that there are three points at which each of the load lines intersect the transient blocking unit characteristic. A stability analysis shows that these intersections are stable and unstable as labeled on FIG. 3.

The transient blocking unit reset problem manifests on FIG. 3 by the presence of more than one stable operating point. Thus, if a transient blocking unit gets stuck at a high-voltage, low-current stable operating point (e.g., as shown on the bottom part of FIG. 3) after a transient, the circuit will not spontaneously reset to the desired normal low-voltage operating point.

It should be noted that if the applied voltage is reduced, the load line moves to the left, and if it is reduced below the reset voltage (14 V in this example), only a single point solution exists. In this case, the transient blocking unit will be reset to the low resistance state, and will stay in that state even if the voltage is increased again, provided the current drawn by the load remains below the trip level.

Figure 4:
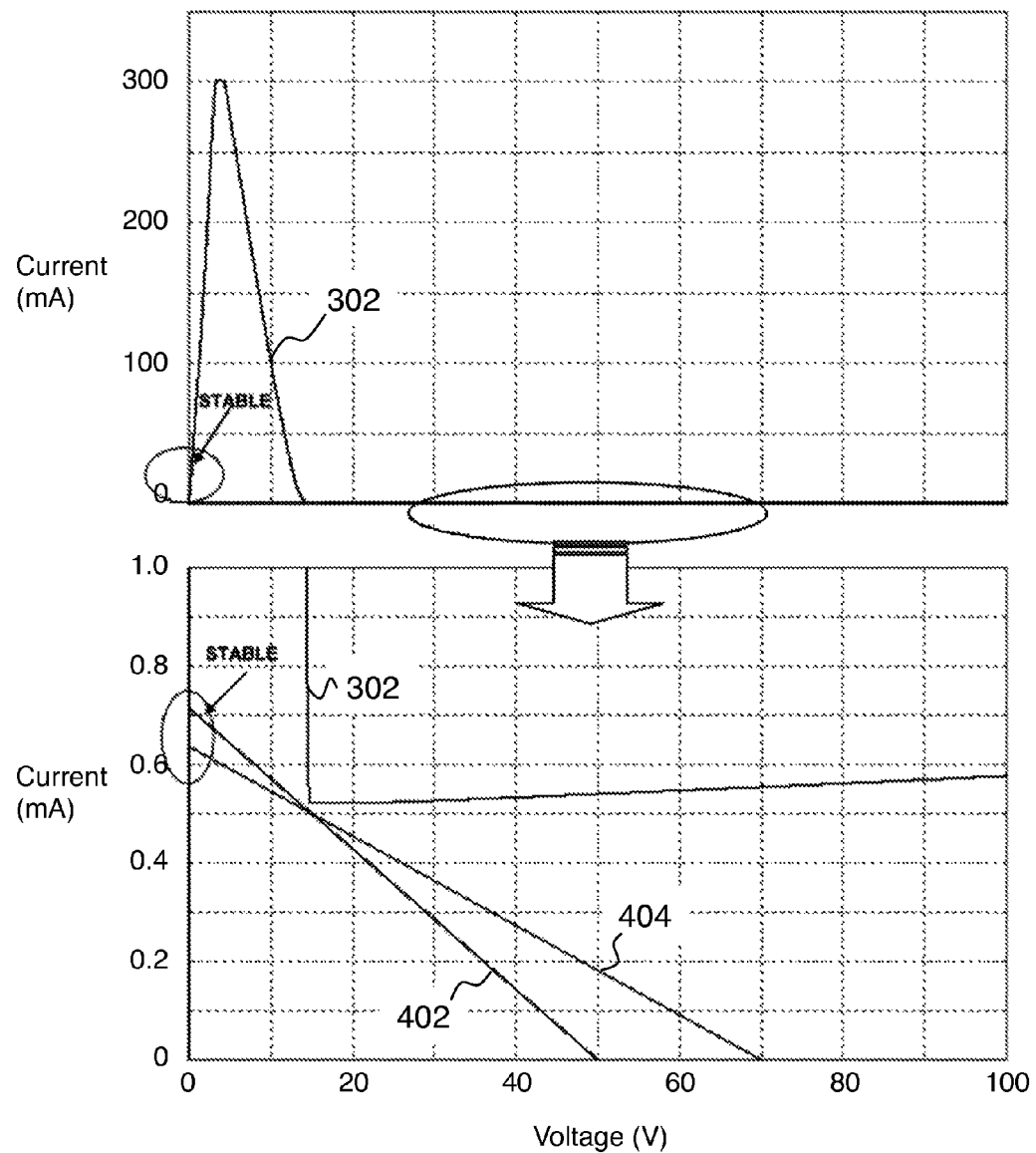
FIG. 4 shows the I-V characteristic of FIG. 2 in relation to a two high-resistance load lines.

An alternative means of resetting the transient blocking unit is to increase the load resistance to greater than a critical value, such that the load line remains below the quiescent current portion of the waveform, as shown in FIG. 4. In this example, load lines 402 and 404 each intersect the transient blocking unit characteristic at only one point, on the left hand side of the figure, at a low current but with the transient blocking unit in the low-resistance state. In this case, the circuit will stabilize unconditionally at that operating point after a transient. However, relatively high load resistance is required for this approach. In this example, where the transient blocking unit has a 1 mA quiescent current, the load cannot be any greater than that of a 70 k load from 50V, or 110 k from 70V, as shown in FIG. 4, otherwise reset cannot be guaranteed.

Figure 5:
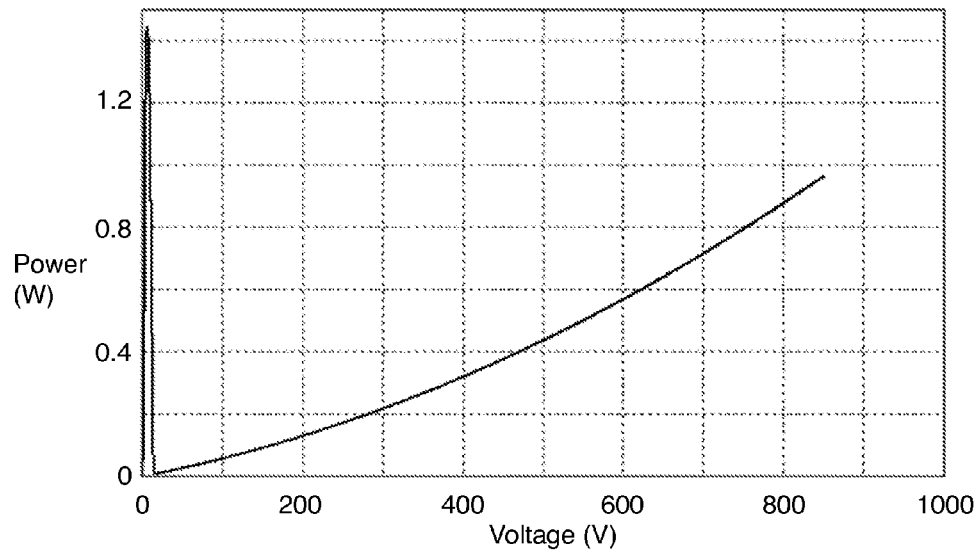
FIG. 5 shows power dissipation vs. voltage for the circuit of FIG. 1.

It can therefore been seen that the quiescent current level affects the ability of the transient blocking unit to reset a given load. Higher reset capability is desirable in many applications, but as mentioned previously, an issue with power dissipation in the transient blocking unit arises if the quiescent current is too high. Because such transient blocking units may have to withstand up to 850V, the peak power with a quiescent current of 1 mA will lead to a peak power of 850 mW, which is close to the maximum capability of typical packages and semiconductors. The plot in FIG. 5 shows how the power varies with applied voltage for a typical protective transient blocking unit.

The preceding considerations can be summarized as follows. Reset of a conventional protective transient blocking unit requires at least one of: 1) A decrease in applied voltage to below the reset voltage; 2) A sufficiently high load impedance; and 3) A sufficiently high quiescent current. The applied voltage and load impedance are often parameters that are given in a design, and therefore cannot be assumed to satisfy their respective reset conditions. Although the quiescent current can be varied in a design, the above-described power dissipation limit significantly limits the design options for this parameter. Accordingly, a conventional protective transient blocking unit can suffer from significant difficulties in providing automatic reset.

Figure 6:
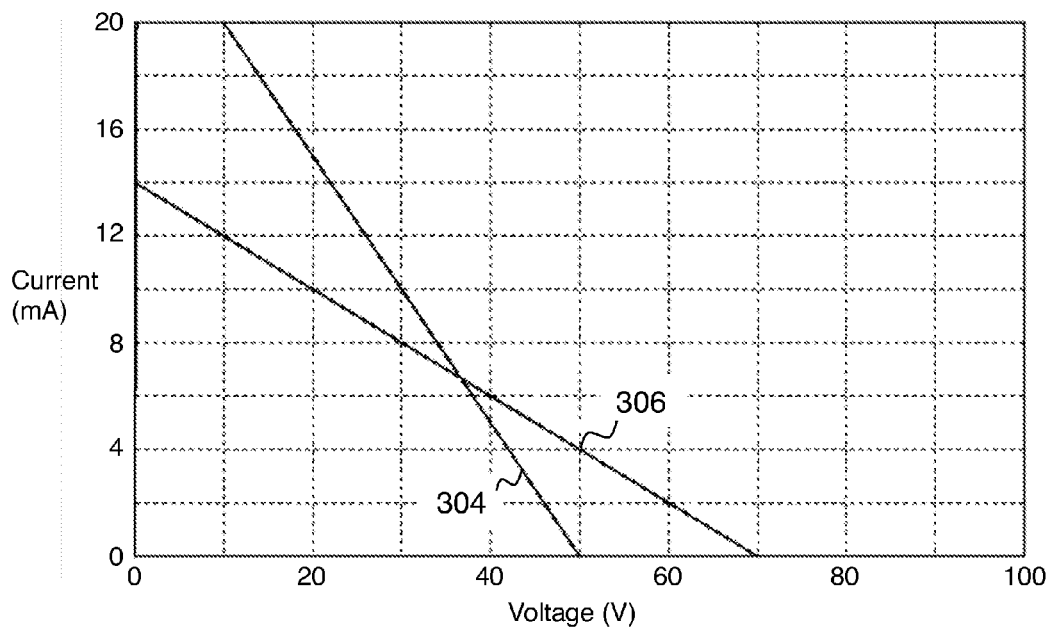
FIG. 6 shows an enlarged view of the low-resistance load lines of FIG. 3.

If the reset requirements of an application (e.g., typical telecom line loads, as shown by lines 304 and 306 on FIG. 6) are examined, it can be seen that if the transient blocking unit I-V characteristic stays above load lines 304 and 306 in the negative resistance and quiescent current regions, then the transient blocking unit will always reset after a transient, because there will be only one stable solution. More explicitly, the intersections of the load line with the I-V characteristic are the only possibilities for a stable solution, and if there is only one intersection it follows that there is only one stable solution.

Figure 7:
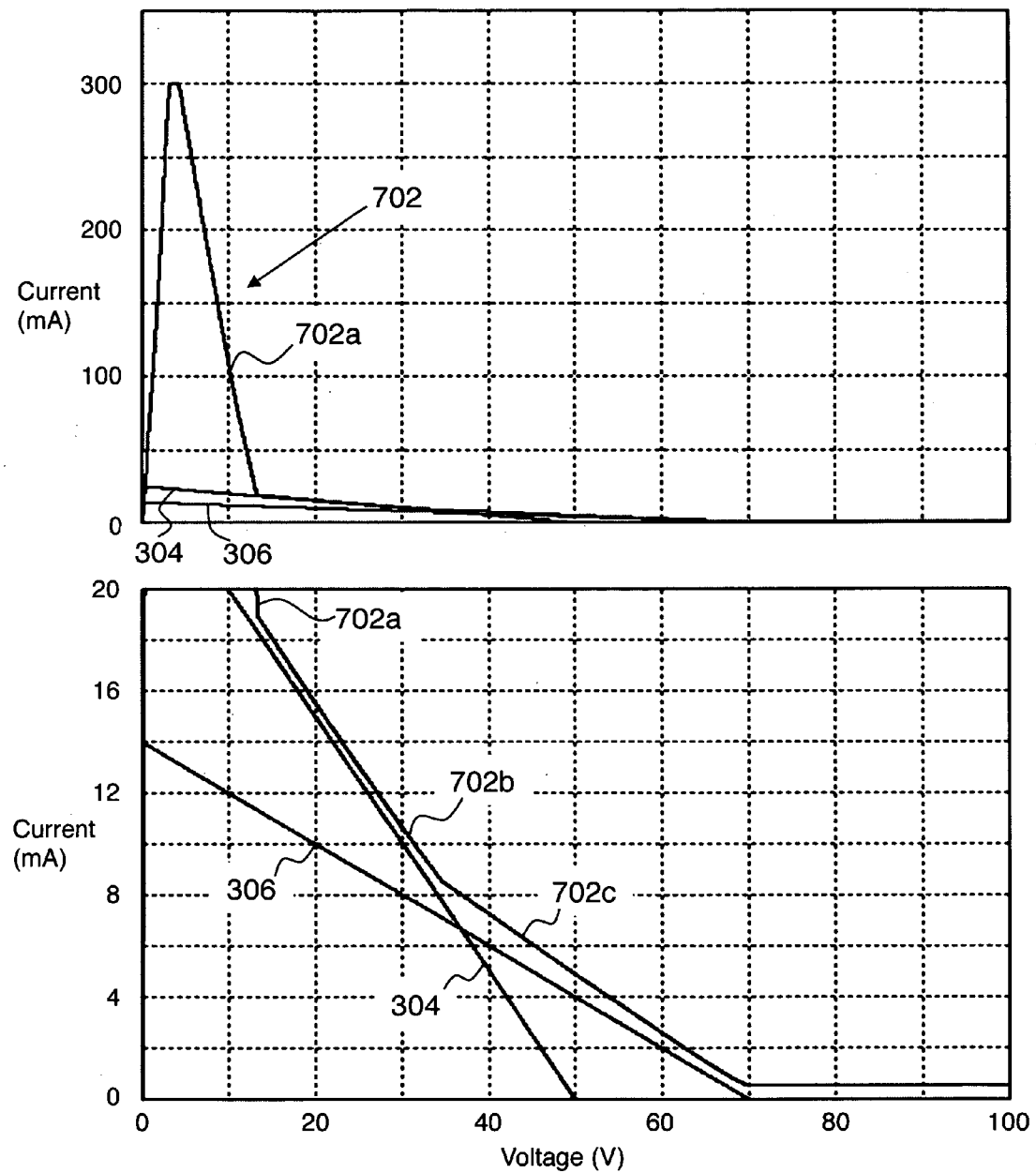
FIG. 7 show the I-V characteristic of an embodiment of the invention in relation to the low-resistance load lines of FIG. 3.

Such a I-V characteristic is shown as 702 on FIG. 7. It can be seen that the negative resistance portion of the waveform is shaped (by segments 702a, 702b, and 702c) such that it stays above the load lines, while still providing the same low resistance on state condition, and same threshold current, as characteristic 302 on FIG. 2. Moreover, if the power dissipation implied by I-V characteristic 702 is calculated versus voltage, as shown on FIG. 8, it can be seen that the power remains at a low level over the working voltage range, such that the average power being dissipated under fault conditions remains comparable to that of a circuit having a conventional I-V characteristic. Comparison of FIGS. 5 and 8 makes this point apparent.

Figure 8:
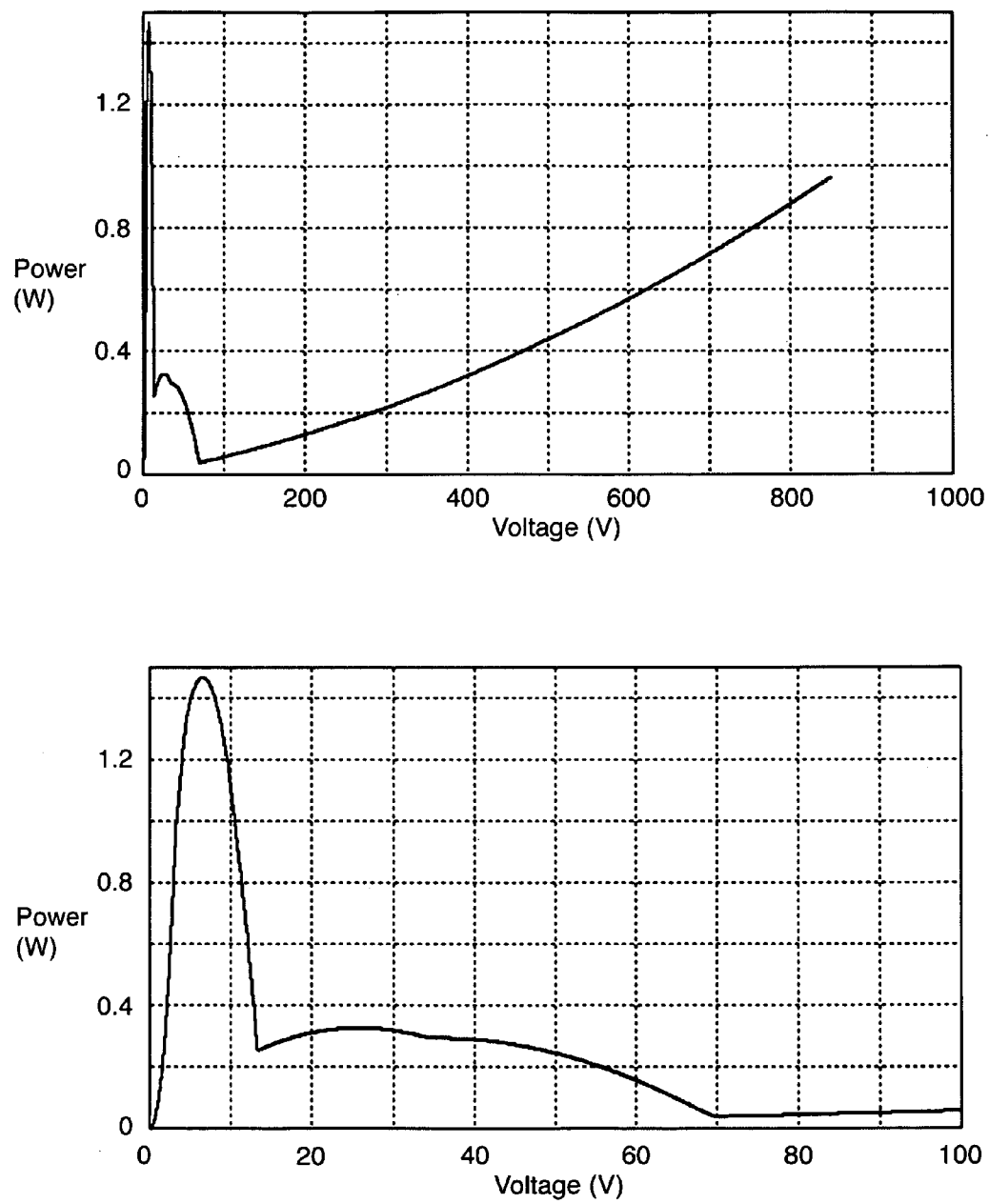
FIG. 8 shows power dissipation vs. voltage for an embodiment of the invention.

Accordingly, FIGS. 7 and 8 show operation of an embodiment of the invention, and it remains to consider various circuit designs that can provide this functionality. One approach for providing this capability is to modify the conventional circuit of FIG. 1 by adding one or more transistors in parallel to each other and to transistor M2. The circuit of FIG. 9 is an example of this approach.

This circuit is similar to the circuit of FIG. 1, except that two additional transistors M4 and M5 are added in parallel to transistor M2, and have gates connected to the gate of M2 via resistors. Preferably, transistors M2, M4, and M5 are p-channel junction field effect transistors (PJFETs), and transistors M1 and M3 are preferably re-channel metal-oxide semiconductor (NMOS) transistors. Each PJFET (i.e., M2, M4, and M5) can be chosen with a different pinch off voltage, and different Rds-on (i.e. size). The main PJFET, M2, is similar in size and pinch off voltage to a conventional transient blocking unit PJFET. The additional PJFETs, M4 and M5, however are smaller and have higher pinch off voltage. They contribute a smaller amount to the on state current, and transition to higher resistance at higher voltages, thus causing the two additional slopes to the characteristic. For example, with reference to characteristic 702 on FIG. 7, transistors M4 and M5 are responsible for the slope changes in characteristic 702 between segments 702a and 702b, and between segments 702b and 702c.

Figure 9:
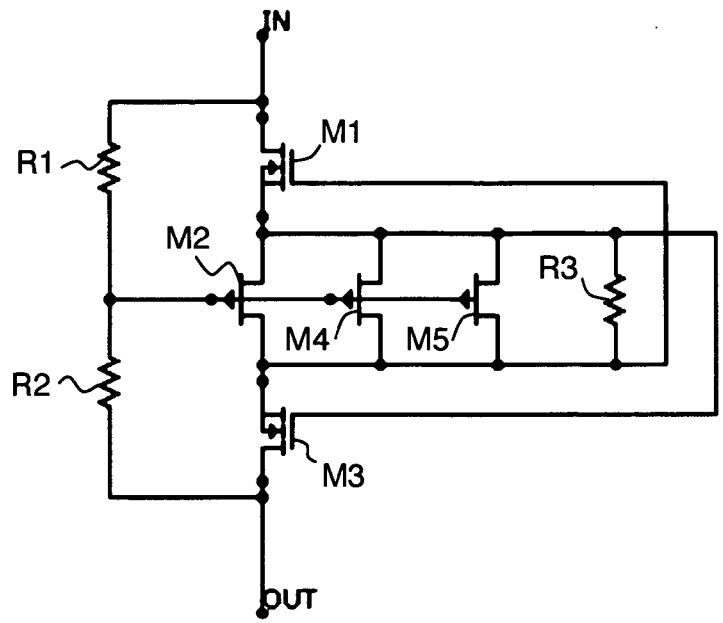
FIG. 9 shows a schematic of a first embodiment of the invention.

However, while the design shown in FIG. 9 can be readily built using discrete components, it is not easy to build as an integrated device, as the requirement for multiple PJFETs of different pinch off voltage adds additional mask and processing costs, thus making the implementation expensive and prone to variations in the relative pinch off voltages.

Figure 10:
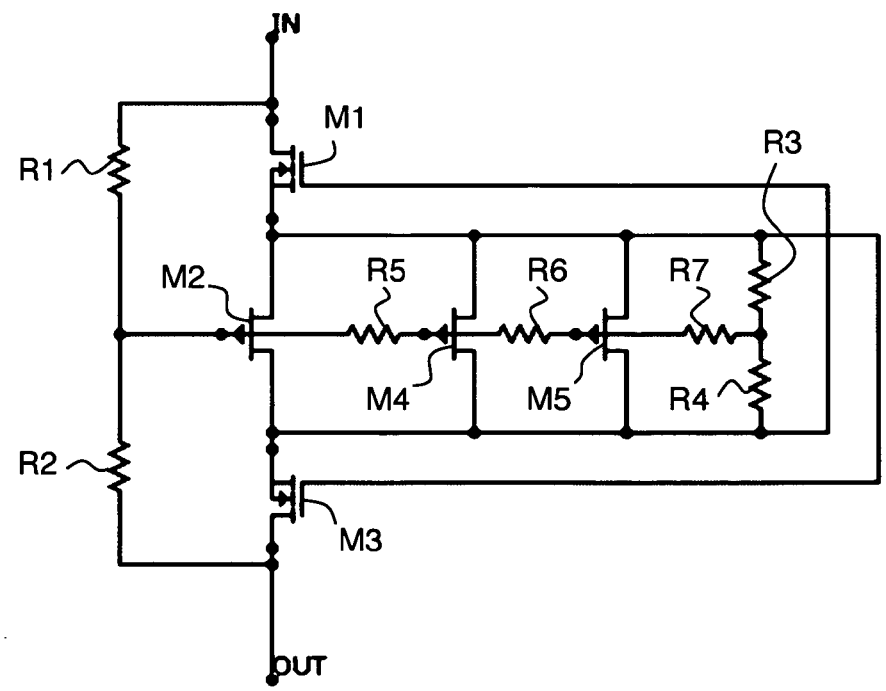
FIG. 10 shows a schematic of a second embodiment of the invention.

Accordingly, a preferred implementation of a transient blocking unit having improved reset is shown in FIG. 10. This approach can have lower fabrication cost than the approach of FIG. 9. Here the additional PJFETs M4 and M5 are smaller versions of the main PJFET, identical except for simply using fewer "fingers" to achieve the higher resistance. The pinch off voltage of each PJFET is the same. However, the feedback to the smaller PJFETs M4 and M5 is now derived by a high resistance feedback chain including resistors R5, R6, and R7 which acts as a voltage divider, thereby causing a staggered transition to high resistance of each PJFET (i.e., each PJFET starts turning off at a different applied voltage to the protective circuit). This resistive voltage divider is connected to the gates of transistors M2, M4 and M5, and resistors R5 and R6 are connected in series between the gates of transistors M2, M4 and M5. The resistor in parallel with PJFET M2 (i.e., R3 on FIG. 9) is now split into two, R3 and R4, so as to provide a balanced center tap for the return of the potential divider.

Figure 11:
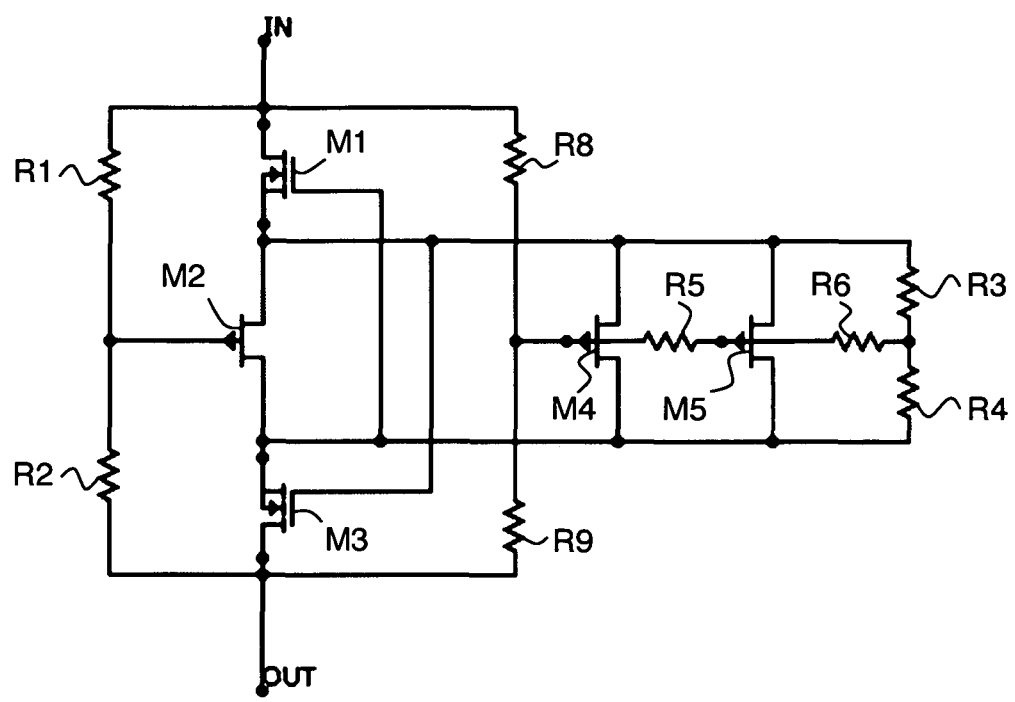
FIG. 11 shows a schematic of a third embodiment of the invention.

In some cases, the gate-source avalanche voltage of M2 may limit the voltage being applied to the gates of the subsequent PJFETs in the circuit of FIG. 10. In such cases, a separate resistive divider chain, R8 and R9, can be employed to drive M4 and M5, as shown in the embodiment of FIG. 11. In the example of FIG. 11, the resistive voltage divider for driving M4 and M5 includes resistive connections to the input and output of the transient blocking unit (i.e., R8 and R9). In addition, the gate of M2 is not connected to the gates of M4 or M5 by one of the resistors in the resistive voltage divider (i.e., no resistor on FIG. 11 is located where R5 is on FIG. 10).

The three circuits of FIGS. 9, 10, and 11 can all provide the desired reset performance (e.g., as shown by characteristic 702 on FIG. 7). Furthermore, the circuits of FIGS. 10 and 11 can be fabricated using the same process and masking operations as a conventional transient blocking unit design.

By considering the preceding examples, several general principles are apparent. Embodiments include a transient blocking unit having one or more blocking transistors connected in series with a parallel transistor subcircuit such that current that passes through the transient blocking unit passes through the blocking transistors and through the parallel transistor subcircuit. The parallel transistor subcircuit includes two or more paralleled transistors having their sources and drains connected in parallel. In the examples of FIGS. 9-11, M1 and M3 are the blocking transistors, and transistors M2, M4, and M5 are the paralleled transistors that make up the parallel transistor subcircuit.

The transient blocking unit automatically transitions to two or more predetermined and distinct negative resistance states when a threshold current is exceeded by an electrical transient. In the example of FIG. 7, these distinct negative resistance states manifest as differences in slope. More specifically, this example shows three different negative resistance states referenced as 702a, 702b, and 702c. In contrast, the conventional transient blocking unit behavior shown on FIG. 3 has only a single negative resistance state (i.e., the state corresponding to 702a on FIG. 7). These negative resistance states are predetermined by the paralleled transistors. Thus, when M4 and M5 are conducting, but M2 is turning off, the state is 702a. When one of M4 and M5 is conducting and the other is turning off (and M2 is off), the state is 702b. When one of M4 and M5 is off and the other is turning off (and M2 is off), the state is 702c. When all three transistors are off, the quiescent current flows (e.g., for voltages >70V on FIG. 7).

Thus, transistors M2, M4 and M5 turn off at different applied voltages to the transient blocking unit. More specifically, $I_T$ and $V_T$ are related by a DC current-voltage characteristic that has a trip point having a voltage $V_{trip}$ and current $I_{max}$ (e.g., as in the example of FIG. 7). The transistors M4 and M5 turn off at $V_T$ voltages greater than $V_{trip}$.

As indicated above, the negative resistance states can be selected to lie above a current-voltage normal load characteristic relating to one or more load types to be protected. This normal load characteristic can relate to several different load types by forming a worst case load characteristic (i.e., for each voltage take the highest current of all of the load characteristics considered). FIG. 7 shows an example of this kind of worst case combination. The preceding examples relate to load lines, but any kind of load characteristic (i.e., straight or curved) can be used in the analysis.

As indicated above, the negative resistance states are preferably selected such that the protective circuit will have only one stable operating point when connected to a load drawing no more current than the predetermined current-voltage load characteristic. Equivalently, the transient blocking unit I-V characteristic should have only a single intersection with the predetermined normal load characteristic. Either of these conditions will ensure automatic reset of the transient blocking unit.

It is preferred for the parallel transistor subcircuit to be disposed in series between two blocking transistors, as in the examples of FIGS. 9, 10, and 11, because such an arrangement provide protection against current transients having both possible polarities. In cases where it is known that transients can have only one of the two possible polarities, then the preceding circuits can be simplified by removing the appropriate one of M1 and M3, depending on the expected transient polarity.

The three PJFET designs of these examples have been specifically tailored to meet the reset requirements of a typical telecom application. However, this technique of cascading smaller PJFETs in parallel, driven through a voltage dividing feedback chain can readily be extended to tailor the shape of the negative resistance region to meet various different applications, by adjusting the feedback resistor ratios, and/or the size of the PJFETs. For more complex characteristics, the present approach can be further extended by adding more than two PJFETs in parallel, allowing the IV characteristic and maximum power of the transient blocking unit to be carefully controlled to suit the application. FIGS. 10 and 11 show two examples of suitable biasing circuits for providing a staggered transition to high resistance of each PJFET. Practice of the invention does not depend critically on the details of such biasing, and any other arrangement of components that performs the same biasing function is also suitable for practicing embodiments of the invention. For example, a separate biasing network can be employed for each of the paralleled transistors.

The invention claimed is:

1. A protective circuit comprising:
  a transient blocking unit comprising one or more blocking transistors having sources and drains connected in series with a parallel transistor subcircuit such that current passing through the transient blocking unit passes through the blocking transistors and through the parallel transistor subcircuit;
  wherein the parallel transistor subcircuit comprises two or more paralleled transistors having their sources and drains connected in parallel;
  wherein the transient blocking unit automatically transitions to two or more predetermined and distinct negative resistance states when a threshold current ($I_{max}$) is exceeded by an electrical transient;
  wherein the negative resistance states are predetermined by the paralleled transistors; and
  wherein the protective circuit has a DC current-voltage characteristic ($I_T(V_T)$) relating current through the transient blocking unit ($I_T$) to voltage applied to the transient blocking unit ($V_T$), wherein the characteristic has a current maximum at a trip point having a voltage $V_{trip}$ and current $I_{max}$, wherein a first paralleled transistor begins to turn off at a voltage threshold of $V_{trip}$, and wherein one or more second paralleled transistors begin to turn off at one or more voltages greater than $V_{trip}$.

2. The circuit of claim 1, wherein each of the paralleled transistors in the parallel transistor subcircuit has its gate driven by a voltage that is a predetermined fraction of an output voltage of the transient blocking unit.

3. The circuit of claim 1, wherein the negative resistance states are selected according to a predetermined current-voltage normal load characteristic relating to one or more load types to be protected by the transient blocking unit.

4. The circuit of claim 3, wherein the negative resistance states are selected such that the protective circuit will have only one stable DC operating point when connected to a load drawing no more current than the predetermined current-voltage load characteristic, whereby the protective circuit automatically resets to a normal operating condition after the electrical transient has ended.

5. The circuit of claim 3, wherein the protective circuit has a DC current-voltage characteristic ($I_T(V_T)$) relating current through the transient blocking unit to voltage applied to the transient blocking unit, and wherein the negative resistance states are selected such that $I_T(V_T)$ and the normal load characteristic have only one intersection, whereby the protective circuit automatically resets to a normal operating condition after the electrical transient has ended.

6. The circuit of claim 3, wherein the predetermined current-voltage normal load characteristic is a worst case envelope of load characteristics for several load types.

7. The circuit of claim 1, wherein the transient blocking unit comprises two blocking transistors connected in series with the parallel transistor subcircuit such that protection is provided for electrical transients having both possible polarities.

8. The circuit of claim 7, wherein the parallel transistor subcircuit is connected between the two blocking transistors.

9. The circuit of claim 1, wherein the paralleled transistors comprise junction field effect transistors.

10. The circuit of claim 1, wherein the paralleled transistors turn off at two or more different applied voltages to the transient blocking unit.

11. The circuit of claim 1, wherein the paralleled transistors have predetermined ratios of on-resistances ($R_{ds-on}$) and have different pinch-off voltages ($V_p$), and wherein gates of the paralleled transistors are connected to each other.

12. The circuit of claim 1, wherein the paralleled transistors have ratios of on-resistances ($R_{ds-on}$) chosen to provide a predetermined negative resistance characteristic and have substantially the same pinch-off voltages ($V_p$), and wherein one or more resistive voltage dividers are connected to gates of the paralleled transistors such that each transistor separately turns off at distinct applied voltages $V_T$.

13. The circuit of claim 12, wherein the resistive voltage dividers include resistors connected between gates of the paralleled transistors to establish divider ratios to provide the predetermined negative resistance characteristic.

14. The circuit of claim 12, wherein the resistive voltage divider includes resistive connections to an input and to an output of the transient blocking unit, and wherein gates of one or more of the paralleled transistors are not connected to a gate of any of the other paralleled transistors by the resistive voltage divider.

* * * * *